(12) United States Patent
Dias et al.

(10) Patent No.: US 12,729,130 B2
(45) Date of Patent: Sep. 8, 2026

(54) DOPED RARE EARTH-CONTAINING MATERIALS AND THEIR PROPERTIES

(71) Applicant: Unearthly Materials, Inc., Rochester, NY (US)

(72) Inventors: Liyanagamage Ranganath Dias, Rochester, NY (US); Sergio Villa-Cortes, Rochester, NY (US); Nugzari Khalvashi-Sutter, Rochester, NY (US); Bo Zheng, Rochester, NY (US); Gustav Michael Borstad, Rochester, NY (US)

(73) Assignee: Unearthly Materials, Inc., Rochester, NY (US)

( * ) Notice: Subject to any disclaimer, the term of this patent is extended or adjusted under 35 U.S.C. 154(b) by 0 days.

(21) Appl. No.: 19/071,642

(22) Filed: Mar. 5, 2025

(65) Prior Publication Data

US 2025/0326655 A1 Oct. 23, 2025

Related U.S. Application Data

(60) Provisional application No. 63/746,122, filed on Jan. 16, 2025, provisional application No. 63/562,192, filed on Mar. 6, 2024.

(51) Int. Cl.
*C01F 17/30* (2020.01)

(52) U.S. Cl.
CPC .......... *C01F 17/30* (2020.01); *C01P 2002/30* (2013.01); *C01P 2002/54* (2013.01); *C01P 2002/72* (2013.01); *C01P 2002/82* (2013.01); *C01P 2004/38* (2013.01); *C01P 2006/40* (2013.01); *C01P 2006/42* (2013.01)

(58) Field of Classification Search
CPC ........................................................ C01F 17/30
See application file for complete search history.

(56) References Cited

U.S. PATENT DOCUMENTS

| | | | |
|---|---|---|---|
| 2023/0301203 | A1 | 9/2023 | Dias |
| 2023/0371403 | A1 | 11/2023 | Dias |

FOREIGN PATENT DOCUMENTS

| | | |
|---|---|---|
| CN | 116246835 | 6/2023 |
| CN | 117920047 | 4/2024 |
| CN | 118529695 | 8/2024 |
| WO | 2023064019 | 4/2023 |

OTHER PUBLICATIONS

Ge et al., Room-Temperature Superconductivity in Boron- and Nitrogen-Doped Lanthanum Superhydride, Physical Review B, 104, 214505, 2021, pp. 1-12.

Hao et al., First-principles calculations on structural stability and electronic properties of nitrogen-doped lutetium hydrides under pressure, Physical Review Research 5, 043238, 2023, pp. 043238-1-043238-9.

(Continued)

*Primary Examiner* — James A Fiorito

(74) *Attorney, Agent, or Firm* — Van Pelt, Yi & James LLP

(57) ABSTRACT

A system including a material is described. The material includes at least one rare earth (R), hydrogen (H), and at least one dopant (D). The material includes R, H, and D with R:H:D in a ratio of 1:x:y, where x is greater than 2 and less than 3, and y is at least 0.4 and less than 1.

10 Claims, 13 Drawing Sheets

(56) References Cited

OTHER PUBLICATIONS

Hilleke et al., Structure, stability, and superconductivity of N-doped lutetium hydrides at kbar pressures, Physical Review B 108, 014511, 2023, pp. 1-12.
Dierkes et al., From metals to nitrides—Syntheses and reaction details of binary rare earth systems, Journal of Alloys and Compounds 693, 2017, pp. 291-302.
Li et al., Stabilization of High-Pressure Phase of Face-Centered Cubic Lutetium Trihydride at Ambient Conditions, Research Article, Advanced Science—Open Access, 2024, pp. 1-8.

200A

200B

200C

200D

300A

300B

300C

400A

400B

400C

400D

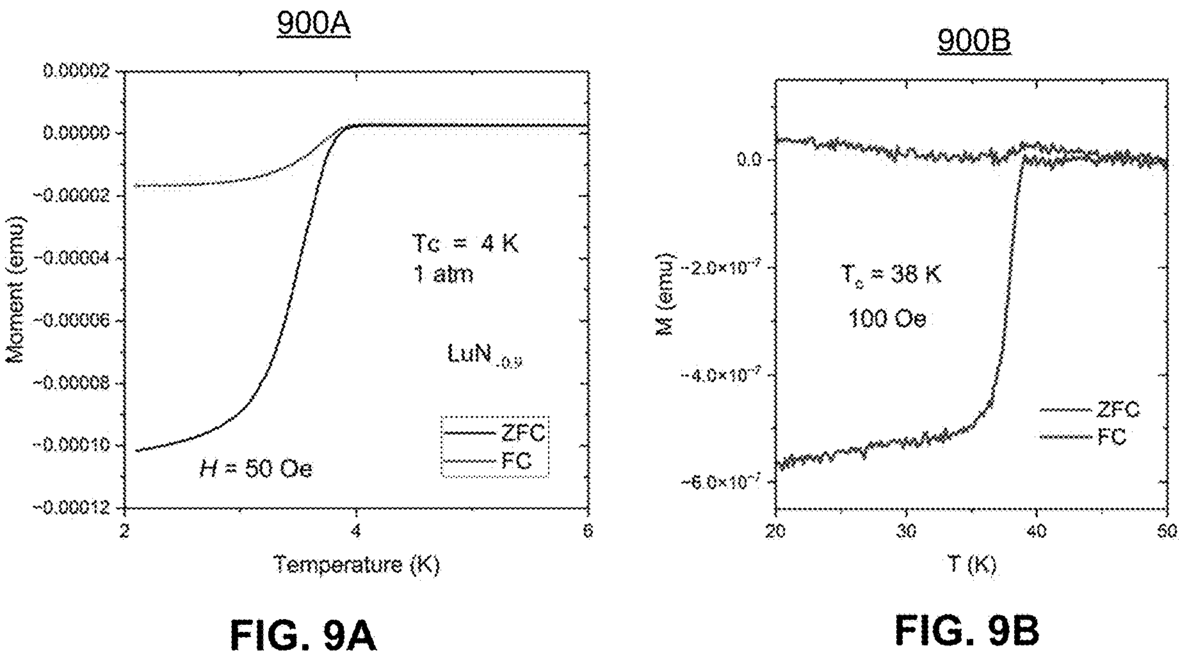
FIG. 9A
FIG. 9B
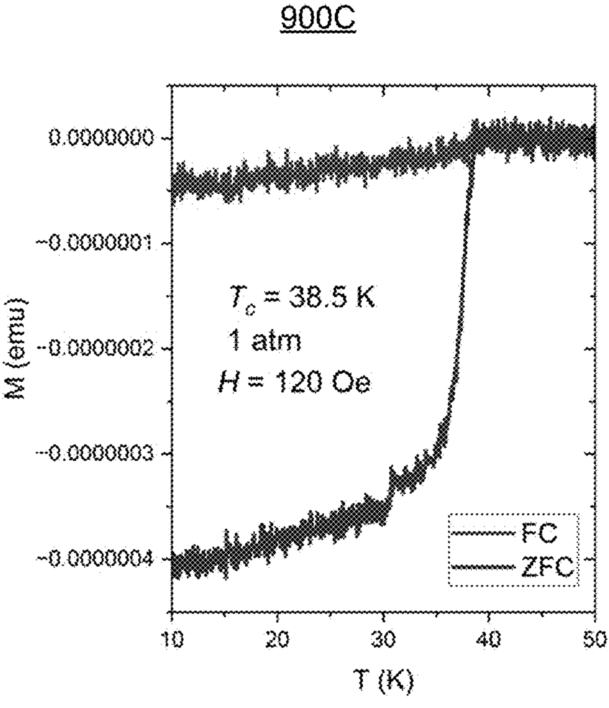
FIG. 9C

1230

1240

1400

Deposit Materials On Substrate

1402

Heat Treat

1404

DOPED RARE EARTH-CONTAINING MATERIALS AND THEIR PROPERTIES

CROSS REFERENCE TO OTHER APPLICATIONS

This application claims priority to U.S. Provisional Patent Application No. 63/562,192 entitled RARE EARTH-CONTAINING MATERIALS AND THEIR PROPERTIES filed Mar. 6, 2024 and U.S. Provisional Patent Application No. 63/746,122 entitled RARE EARTH NITRIDES AND HYDRIDES AND THEIR PROPERTIES filed Jan. 16, 2025, both of which are incorporated herein by reference for all purposes.

BACKGROUND OF THE INVENTION

Rare earths, such as scandium, yttrium, lutetium, lanthanum, and ytterbium, are of interest for a variety of reasons. Rare earths are usable in various technologies due to their properties, such as their thermal, magnetic, and electrical characteristics. Compounds including rare earths may be of particular interest. For example, yttrium barium copper oxide (YBCO, or $YBa_2Cu_3O_7$) is a high temperature superconductor. Yttrium may also be used in yttrium aluminum garnet (YAG) lasers, as well as in ceramics and alloys. Similarly, scandium may be used in alloys for aerospace and other applications, in solid oxide fuel cells, as well as in other applications. Lutetium may also be used in lenses, as catalysts, in LEDs, and for other technologies, Other rare earths may have other applications. Ongoing developments may identify new uses for materials containing rare earths. The applications for which rare earths may be used may depend upon the crystal structure of the materials that include the rare earths, which influences the electrical, magnetic, and mechanical properties of these materials. Consequently, techniques for investigating the structure and resulting characteristics of materials including rare earths are desired.

BRIEF DESCRIPTION OF THE DRAWINGS

Various embodiments of the invention are disclosed in the following detailed description and the accompanying drawings.

FIGS. 8A-8C depict embodiments of Raman spectra corresponding to a rare earth-containing material such as sub-stoichiometric lutetium nitride.

FIGS. 9A-9C depict graphs of temperature dependent DC magnetic susceptibility data corresponding to a rare earth-containing material such as sub-stoichiometric lutetium nitride.

DETAILED DESCRIPTION

Figure 1A:
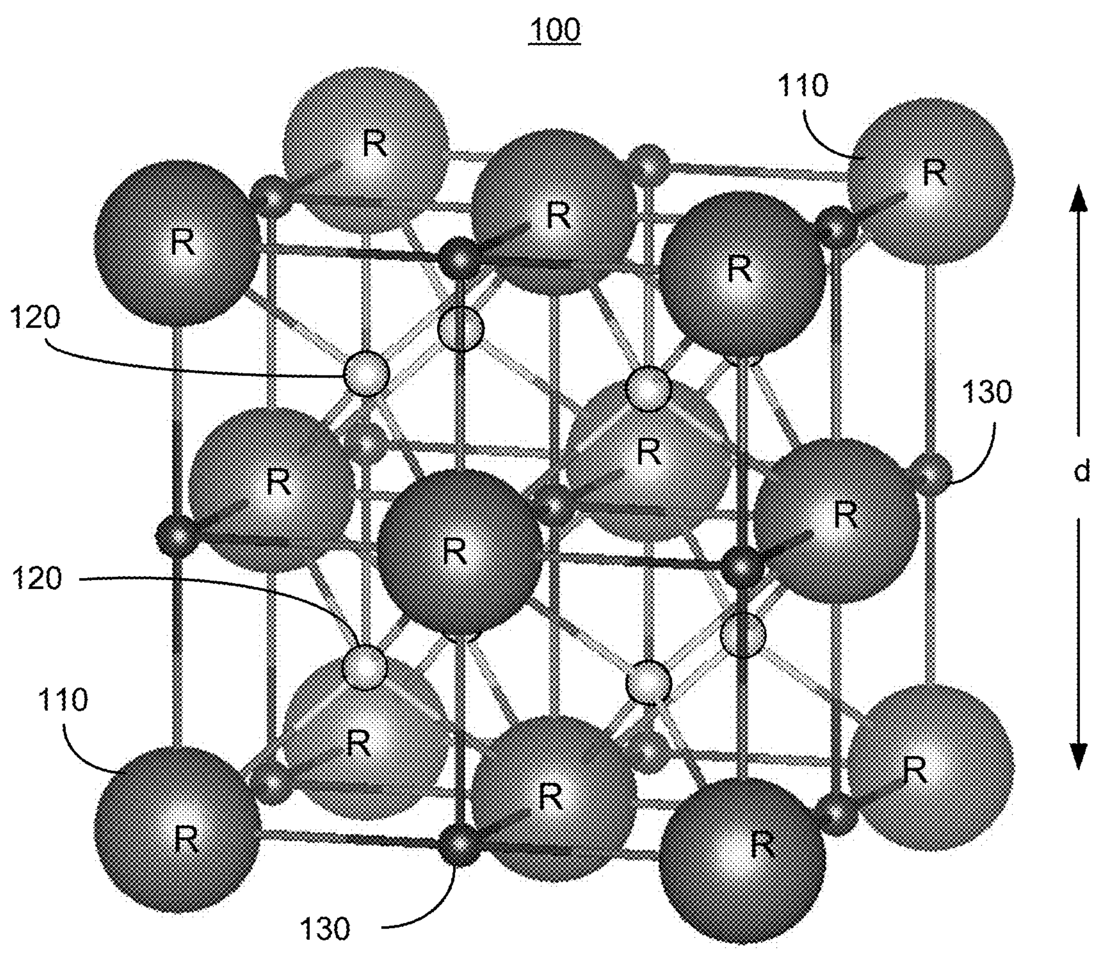
FIGS. 1A-1B are a diagram indicating the crystal structure of an embodiment of a doped rare earth hydride.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Rare earths are of use in a number of applications. The applications for which rare earths may be used depend upon the properties (e.g., electrical, magnetic, and/or mechanical properties) of the materials incorporating the rare earths. These properties depend upon the structures of the materials. The structure (e.g., the crystal structure) may depend upon the rare earth(s) used, as well as the elements with which the rare earth(s) are combined. Further, changes in the structure of the materials due to the addition of other elements (e.g., doping) may result in changes to the characteristics of the materials. Consequently, techniques for investigating the structure and resulting characteristics of materials including rare earths are desired.

A system including a material is described. The material includes at least one rare earth (R), hydrogen (H), and at least one dopant (D). The material includes R, H, and D with R:H:D in a ratio of 1:x:y, where x is greater than 2 and less than 3, and y is at least 0.4 and less than 1. In some embodiments, the material is present at least in a temperature range of at least twenty degrees Celsius and not more than one hundred degrees Celsius and in a pressure range of at least one half atmosphere and not more than 1.5 atmospheres of pressure. In some embodiments, the material is present in a much larger range of temperatures and/or pressures. For example, the material may be present in temperatures as low as 273K, 100 K, 50K, or 5K and to temperatures as high as 300° C., 400° C., 500° C., 600° C., or 700° C. Similarly, the material may be present down to a few millibars of pressure. The material may also be present in higher pressures, for example up to at least 2 atmospheres, 3 atmospheres, 10 atmospheres of pressure, or higher. In some embodiments, R is a single rare earth and the dopant, D, is a single dopant. In some embodiments, R is lutetium, and D is nitrogen. The material may have a crystal structure and a stoichiometry $RH_xD_y$ (e.g., $LuH_xN_y$). In some such embodiments, x is at least 2.1 and not more than 2.4 and y is at least 0.7 and not more than 0.8.

The crystal structure of the material may have face-centered cubic positions, tetrahedral positions, and octahedral positions in a cell. In such embodiments, the face-centered cubic positions include R atoms, the tetrahedral positions include H atoms, and the octahedral positions include both the H atoms and D atoms. In some such embodiments, a portion of the octahedral positions, the face-centered cubic positions, and/or the tetrahedral positions have at least one vacancy. Further, the material may have a lattice parameter that depends on x and y.

The material may be present (e.g., in the temperature range(s) and/or the pressure range(s) described) with at least one additional material. The additional material(s) may also include the rare earth(s). For example, the material $LuH_xN_y$ may be present along with $LuH_2$ and/or $LuH_3$. Further, the material may take on forms such as a powder, a bulk sample, or a thin film residing on a substrate and having a thickness of at least ten nanometers and not more than three micrometers. In some embodiments, the material may also include least one of O and Si (e.g., $RH_xD_yO_uSi_w$, where u and w may be small, for example, u, w<0.1).

A system including a material is described. The material includes at least one rare earth (R) and nitrogen (N). The material includes R and N with R:N in a ratio of 1:y, where y is greater than zero and less than one. In some embodiments, the material is present at least in the temperature range(s) and pressure range(s) described herein. The material may have a crystal structure and a stoichiometry $RN_y$ (e.g., $LuN_y$). In such embodiments, y is greater than 0 and less than one. In some embodiments, y is greater than 0.6 and less than 0.9. The crystal structure of the material may have face-centered cubic positions and octahedral positions. The face-centered cubic positions include R atoms and the octahedral positions include N atoms. A portion of the octahedral positions have at least one vacancy.

A method is described. The method includes providing at least one precursor material and providing, using the precursor material(s), a material including at least one rare earth (R), hydrogen (H); and a dopant (D). The material includes R, H, and D in a ratio of 1:x:y, where x is zero or greater than 2 and less than 3, and y is at least 0.4 and less than 1. For y=0, D may be nitrogen N. For example, R may be lutetium, D may be nitrogen (e.g., $LuN_y$, where $0<y<1$) and the precursor material(s) may be selected from $LuH_2$ or $LuH_3$.

In some embodiments, providing the material from the precursor material(s) includes annealing the precursor material(s) in a D-containing gas at temperature(s) greater than a decomposition temperature of the precursor material(s). Where x is greater than 2 and less than 3, the providing the material further includes reducing the temperature to within a temperature range below the decomposition temperature of the precursor material(s). The temperature range is greater than one hundred degrees Celsius and less than the decomposition temperature. The method also includes annealing at temperature(s) within the temperature range. In some embodiments, providing the precursor material(s) includes obtaining premade precursor material(s). In some embodiments, providing the precursor material(s) include synthesizing the precursor material(s). For example, fcc (face centered cubic)-$LuH_2$ and hcp (hexagonal close pack)-$LuH_3$ may be synthesized from Lu and hydrogen gas. In some embodiments, providing the material further includes depositing the material using the at least one precursor material as a deposition source.

The techniques are described in the context of the rare earth lutetium, nitrogen, and hydrogen. For example, nitrogen doped lutetium hydride (which might also be considered hydrogen doped lutetium nitride) is discussed. One of ordinary skill in the art will recognize that the techniques described may be applied to other rare earths and, in some embodiments, other elements and/or dopants. Further, specific configurations are described and depicted for clarity. One of ordinary skill in the art will recognize that other configurations may be possible. For example, particular stoichiometries are specifically discussed. Other analogous stoichiometries may be possible.

Figure 1B:
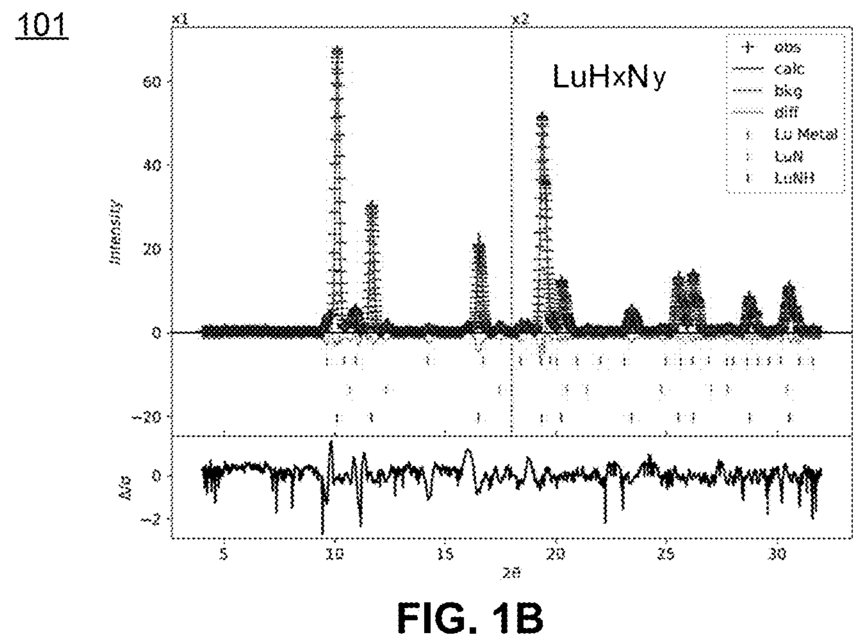

FIGS. 1A-1B describe an embodiment of a rare earth-containing material. FIG. 1A depicts a three-dimensional view of the structure of cell 100 for an embodiment of rare earth-containing material. Thus, some portions of cell 100 may be obscured. Further, FIG. 1A is not to scale. FIG. 1B is a graph depicting x-ray diffraction spectrum 101 for one embodiment of the rare earth-containing material. In some embodiments, cell 100 is for a material including a rare earth (R), an additional element such as hydrogen (H), and a dopant (D) such as nitrogen. Thus, cell 100 may be considered to be a cell for nitrogen doped lutetium hydride. As such, the term rare earth-containing material when used in the context of cell 100 may be considered to be nitrogen doped lutetium hydride, and vice versa. In other embodiments, other and/or multiple rare earths, multiple additional elements and/or other and/or multiple dopants may be present in cell 100. For example, rare earths (R) such as ytterbium, yttrium, cerium, lanthanum, scandium, and/or thulium might be used in addition to or in lieu of lutetium as R. Alloys including rare earth(s) may also be used as or included in R. For example, yttrium-zirconium and/or yttrium-strontium alloys might be used. Similarly, boron, zirconium, tungsten, strontium, and/or small amounts of oxygen might be used in addition to or in lieu of nitrogen as D.

In some embodiments, the rare earth-containing material corresponding to cell 100 includes R, H, and D in a ratio of 1:x:y=R:H:D, where x is greater than 2 and less than 3, and y is at least 0.4 and less than 1. In some embodiments, this may be considered to form the material $RH_xD_y$, where $2<x<3$ and $0.4\leq y<1$. Consequently, the rare earth-containing materials are discussed in this context (e.g., $RH_xD_y$, $LuH_xN_y$, etc.). For example, the material may be $LuH_xN_y$, where x and y have the values indicated. In some embodiments, x is greater than 2 and not more than 2.8 and y is at least 0.6 and less than 1. In some embodiments, x is greater than 2 and not more than 2.4. In some embodiments, x is at least 2.1 and not more than 2.3 (e.g., nominally 2.2). In some embodiments, y is at least 0.5 and less than 1. In some such embodiments, y is at least 0.6. In some such embodiments, y is at least 0.7. In some embodiments, y is not more than 0.9. In some embodiments, y is at least 0.65 and not more than 0.9 (e.g., nominally 0.7-0.8, or 0.71-0.75). For example, in some embodiments, x may be greater than 2.1 and not more than 2.3 and y may be at least 0.7 and not more than 0.8. Other analogous stoichiometries are possible. Thus, in some embodiments, x+y is less than or equal to 3.

The rare earth-containing material corresponding to cell 100 is also stable at ambient conditions. As used herein, "stable" indicates that the material is present and can. but need not, include the material being nonreactive. In some embodiments, the rare earth-containing material is stable/present at least in a temperature range of at least twenty degrees Celsius and not more than one hundred degrees Celsius and in a pressure range of at least one half atmosphere and not more than 1.5 atmospheres of pressure (e.g., at ambient/room temperature and pressure). In some embodiments, the material is stable (e.g., present) in a much larger range of temperatures and/or pressures. For example, the material may be present in temperatures as low as 273K, 100 K, 50K, or 5K and to temperatures as high as 300° C., 400° C., 500° C., 600° C., or 700° C. Similarly, the material may be present down to a few millibars of pressure. The material may also be present in higher pressures, for example up to at least 2 atmospheres, 3 atmospheres, 10 atmospheres of pressure, or higher.

Cell 100 may have three types of sites, or positions, 110, 120, and 130. For simplicity, only some positions 110, 120, and 130 are labeled. Positions 110 are locations at which atoms of the rare earth material(s) (R) may be located. Thus, rare earth positions (R positions) 110 are labeled R and are shown as large, darkly shaded spheres. Rare earth positions 110 are at face-centered cubic locations in cell 100. Thus, cell 100 is termed a face-centered cubic (FCC) cell. In some embodiments, therefore, the rare earth-containing material is an FCC material. In general, all of R positions 110 are occupied by rare earth atoms (e.g., Lu atoms). However, one of ordinary skill in the art will recognize that in a macroscopic sample, composed of a large number of cells 100, there may be some defects. For example, there may be vacancies for which a rare earth atom is missing from particular R position(s) 110. However, such defects may not be sufficient to affect the stoichiometry and/or material properties.

Cell 100 also includes tetrahedral positions 120 (indicated by lighter circles) and octahedral positions 130 (indicated by darker circles). In some embodiments, hydrogen atoms reside in tetrahedral locations 120. For octahedral positions 130, a nitrogen atom or a hydrogen atom may be present. If all tetrahedral positions 120 and octahedral positions 130 were occupied by hydrogen atoms, then cell 100 may have the formula $RH_3$. Similarly, if all tetrahedral positions 120 and all octahedral positions 130 were occupied by H and/or D, then for cell 100 $RH_xD_y$, x+y=3.

In some embodiments the rare earth-containing material described by cell 100 is sub-stoichiometric. Stated differently, for the rare earth-containing material corresponding to cell 100, $RH_xD_y$, x+y<3. Consequently, x and y have the ranges indicated above. For example, for lutetium, hydrogen, and nitrogen, the rare earth-containing material is $LuH_xN_y$, where x is greater than 2 and not more than 2.8 and y is at least 0.6 and less than 1 (i.e. 2<x+y<3). In some embodiments, the rare earth material may be $LuH_{2-2.4}N_{0.7-0.8}$ or $LuH_{2.1-2.3}N_{0.7-0.74}$. Thus, in some embodiments, not all octahedral positions 130 include nitrogen atoms or hydrogen atoms. Similarly, in some embodiments, hydrogen atoms may not be present at all tetrahedral positions 130. Consequently, the rare earth-containing material $LuH_xN_y$ for cell 100 is sub-stoichiometric.

In addition to being of interest for its own properties, the rare earth-containing material for cell 100 may be used to investigate the effects of changes in stoichiometry and/or composition for rare earth-containing materials. For example, for the material $LuH_xN_y$ with x and y in the ranges described herein (e.g., $LuH_{2-2.8}N_{0.6-0.9}$), changes in the stoichiometry may affect the lattice parameter, d, as well as other properties. Further, $LuH_xN_y$ may be compared with LuN (i.e. x=0, y=1), $LuH_2$ (i.e. y=0, x=2) and/or $LuH_3$(i.e. y=0, x=3). LuN, $LuH_2$, and $LuH_3$ are commercially available or may be fabricated. Thus, the properties of $LuH_xN_y$, where x and y have the ranges above (including 2<x+y<3), may be compared to the properties of LuN, $LuH_2$, and/or $LuH_3$ to investigate the effects that changes in stoichiometry may have on the crystal structure and other properties of a rare earth-containing materials. In addition, LuN, $LuH_2$, and/or $LuH_3$ may be used to fabricate $LuH_xN_y$ for an improved analysis.

For example, lattice parameters and crystal structure may be determined using x-ray diffraction. Comparisons of lattice parameters for similar, arguably related structures may be made based on the results of x-ray diffraction characterizations. FIG. 1B depicts a graph of one embodiment of x-ray diffraction spectrum 101 for $LuH_xN_y$. For $LuH_xN_y$ corresponding to cell 100, the lattice parameter d may be in the range of 5.04 to 5.07 Å, based on x-ray diffraction measurements. For example, for $LuH_{2.1-2.3}N_{0.71-0.73}$ (FCC with Fm-3m) the lattice parameter is approximately 5.065 Å. This can be contrasted with known or calculated values for LuN, LuH, $LuH_2$, and/or $LuH_3$. For example, $LuH_2$ is known to be cubic (e.g., FCC with Fm-3m) and to have a lattice parameter of 5.029 to 5.033 Å. See, e.g., FIG. 2A, described below. Similarly, $LuH_3$ is known to have a lattice parameter of approximately 5.12 to 5.156 Å for the cubic (FCC) form. See, e.g., FIG. 2B, described below. Stoichiometric LuN is known to have a cubic, rock-salt structure having a lattice parameter of 4.75 to 4.76 Å. Finally, LuH, which also has a rock-salt structure, is known to have a theoretical lattice parameter of 4.80 Å. Thus, the lattice parameter of $LuH_xN_y$ corresponding to cell 100 is closer in size to the lattice parameters of similar materials (e.g., $LuH_2$ and $LuH_3$) having a similar crystal structure (e.g., FCC as opposed to rock-salt). However, the lattice parameter of $LuH_xN_y$ corresponding to cell 100 is larger than that of fcc-$LuH_2$ and smaller fcc-$LuH_3$ despite the lattice parameter of LuN being significantly smaller.

These differences in lattice parameters might be understood as follows. When nitrogen is introduced into the octahedral positions 130 of cell 100 (e.g., having a cubic Fm-3m structure), the effect on the lattice parameter may depend on several factors, including the size of the nitrogen atoms compared to the hydrogen atoms (e.g., for $LuH_xN_y$ compared to $LuH_2$) and the specific electronic interactions that occur in the resulting compound. In general, if additional atoms are added to the interstices of the lattice, the lattice may expand. Thus, an expansion of the crystal structure and a larger lattice parameter may result for $LuH_2$ transitioning to $LuH_3$. Conversely, if the incorporation of the atom leads to stronger bonding interactions, it could lead to a contraction of the crystal structure and a smaller lattice parameter. If the nitrogen atoms are larger than the hydrogen atoms being replaced and if the incorporation of nitrogen into the tetrahedral sites allows the lattice to expand more freely, then the lattice parameter may be expected to increase for the nitrogen occupying tetrahedral position. In the case of $LuH_xN_y$, however, the introduction of nitrogen into the lattice (e.g., as compared to $LuH_2$ and $LuH_3$) appears to result in an intermediate the lattice parameter. More specifically, for a transition from FCC-$LuH_2$ to FCC-$LuH_3$, the lattice expansion is due to the addition of hydrogen to the interstices of the lattice. Thus, the fcc-$LuH_3$ lattice parameter may be around 5.12 to 5.156 Å. However, when nitrogen is introduced to octahedral positions, the strong electronegativity of nitrogen may cause the lattice to contract. As a result, the lattice parameter for $LuH_xN_y$ is in the range described (e.g., approximately 5.04 to 5.07 Å).

In some embodiments, the rare earth-containing material of interest (e.g., $LuH_xN_y$ where x and y are in the ranges described, e.g., $2<x<3$ and $0.5\leq y<1$) may be mixed with other materials. This may occur due to the fabrication process(es) utilized. Thus, $LuH_xN_y$ may be present in combination with another material that includes a rare earth (e.g., Lu). For example, in some cases, $LuH_xN_y$ is fabricated from $LuH_2$ and nitrogen gas. The $LuH_2$ may not fully covert to $LuH_xN_y$. For example, if $LuH_xN_y$ is formed from a bulk sample (e.g., a large chunk) of $LuH_2$ less $LuH_xN_y$ may be formed. For finer powders, a higher fraction of the $LuH_2$ may be converted to $LuH_xN_y$. In some cases, the majority phase may be $LuH_xN_y$. For thin film technologies, it may be possible to provide thin films (e.g., by co-deposition or deposition of multilayers at elevated temperatures or at room temperature followed by an anneal) that have a majority of $LuH_xN_y$ or $LuH_xN_y$ in isolation (e.g., a very high fraction of or only $LuH_xN_y$). In such cases, x-ray diffraction may be used to determine whether $LuH_xN_y$ exists in isolation or with other materials as well as the composition of the other materials. For example, x-ray diffraction may indicate that a portion of the material has a different lattice parameter than that of $LuH_xN_y$. As such, x-ray diffraction may be used in conjunction with other techniques to investigate the structural properties of $LuH_xN_y$ and compare these properties with other rare earth-containing materials. Consequently, fabrication techniques and/or the suitability of $LuH_xN_y$ (or other rare earth-containing materials) for particular applications may be evaluated.

In addition to the crystal structure (e.g., FCC versus rock-salt), the stoichiometry and/or locations of individual atoms within the cell 100 are desired to be determined and compared to other similar rare earth-containing materials. For example, a determination of which atoms are at positions 110, 120, and 130 is desired determined and compared to the positions of corresponding atoms in analogous rare earth-containing materials. Similarly, the effects of variations in stoichiometry (e.g., $LuH_{2\delta}N_{1-\varepsilon}$ where δ and ε may vary and are small) are also desired to be investigated. For example, R atoms (Lu atoms) may be at R positions 110 (i.e. FCC locations), H atoms may be at tetrahedral positions 120, and a mix of H atoms and N atoms may be at octahedral positions 130 (with some vacancies—not expressly indicated in cell 100). Other than the size of the lattice parameter, this structure may be indistinguishable from materials such as $LuH_2$, $LuH_3$ and/or LuN using X-ray spectroscopy. Thus, X-ray diffraction alone may be inadequate for such studies. However, the stoichiometry might be determined using Raman spectroscopy. Such material(s) may have interesting properties for crystal lattice studies, such as a different lattice parameter and/or different electronic structure properties.

In some embodiments, Raman spectroscopy is the desired technique for accurately determining the stoichiometry of the rare earth-containing material. Raman spectroscopy may be particularly useful where nitrogen doped lutetium hydride (or other analogous doped rare earth hydride) is mixed with other stoichiometries. The lattice constant of the nitrogen doped rare earth hydride (e.g., $LuH_xN_y$) changes based upon the stoichiometry. Similarly, the lattice constant of the $LuH_xN_y$ may change with the addition of other materials, such as oxygen. In some embodiments, the fabrication process may result in O and/or Si (in some cases trace amounts thereof) being present. Raman spectroscopy may also be used to identify changes in stoichiometry (e.g., changes in x and/or y, or the presence of vacancies) or the presence of such materials. In some such embodiments, the rare earth-containing material may take the form $RH_xD_yD2_w$, where D2 is O and/or Si and w is less than 0.3 (e.g., $0\leq w<0.3$)

Figure 2A:
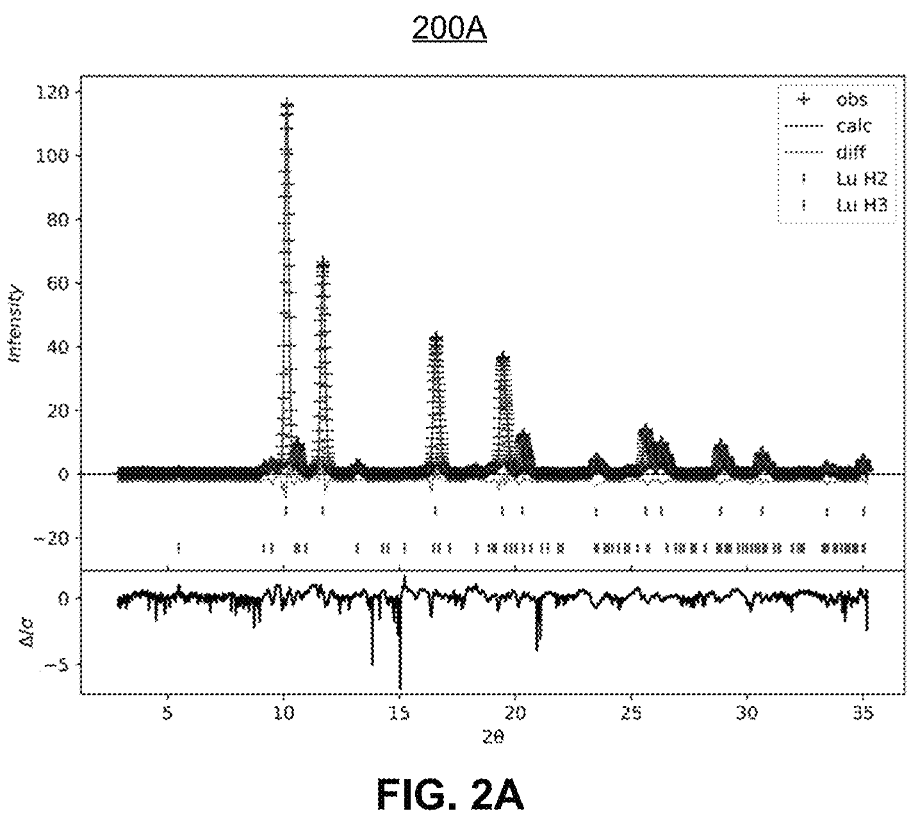
FIGS. 2A-2D depict embodiments of x-ray and Raman spectra corresponding to a rare earth-containing material such as nitrogen doped lutetium hydride.
Figure 2B:
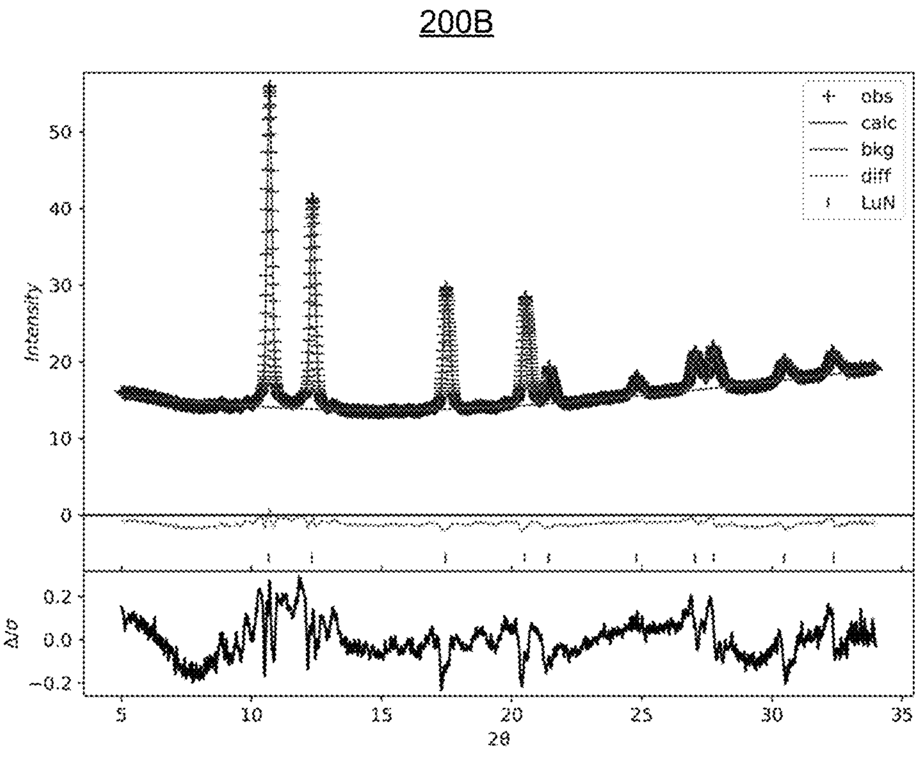

For example, FIGS. 2A-2D depict graphs 200A, 200B, 200C, and 200D corresponding to $LuH_2$, $LuH_3$, and embodiments of a rare earth-containing material such as $LuH_xN_y$. The analysis herein may apply to other analogous rare earth-containing materials such as $RH_xD_y$. FIG. 2A depicts graph 200A of x-ray diffraction data for $LuH_2$ and minor amount of hcp-LuH3. FIG. 2B depicts graph 200B of x-ray diffraction data for LuN. Although lattice parameter and other characteristics of $LuH_2$ and LuN may be determined from such spectra, some structural features of rare earth-containing materials may not be resolved with such techniques.

Figure 2C:
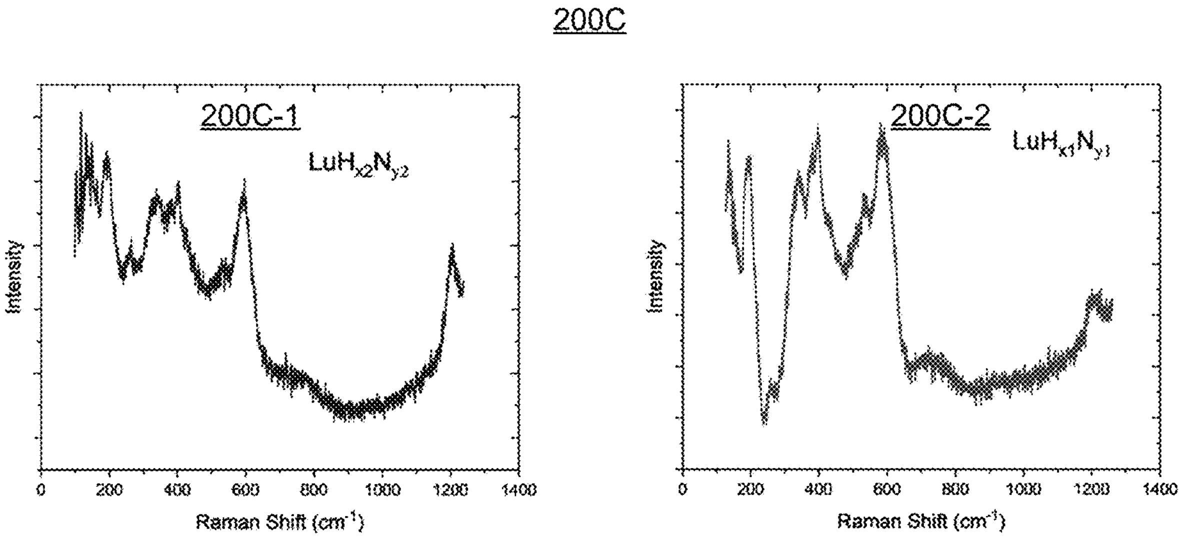
Figure 2D:
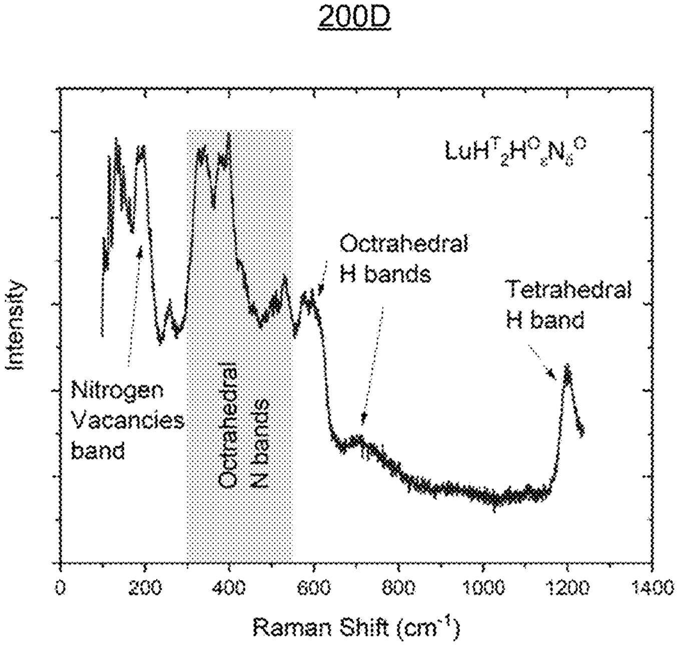

FIG. 2C depicts graph 200C of Raman spectra 200C-1 and 200C-2 for two stoichiometries of $LuH_xN_y$ (i.e. $LuH_{x1}N_{y1}$ and $LuH_{x2}N_{y2}$). Differences in spectra 200C-1 and 200C-2 correspond to differences in stoichiometries despite the presence of the same constituent atoms (e.g., Lu, H, and N). FIG. 2D depicts graph 200D of a Raman spectrum with regions corresponding to positions 120 and 130 of cell 100 for $LuH_xN_y$. In particular, octahedral bands corresponding to H atoms and N atoms residing at octahedral positions 130 and a tetrahedral band corresponding to H atoms residing at tetrahedral positions 120 are shown. The octahedral H band may be understood as H atoms replacing N atoms at octahedral locations 130, which may create vacancies. A nitrogen vacancies band corresponding to vacancies for nitrogen atoms at octahedral positions 130 are also indicated. As such, for the particular sample shown, it is indicated that tetrahedral positions 120 are fully occupied by hydrogen atoms ($H^T_2$, where T indicates tetrahedral positions) while octahedral positions 130 are occupied by both hydrogen and nitrogen atoms, but that vacancies do exist ($H^O_\varepsilon N^O_\varepsilon$, where $\varepsilon+\delta<1$). Stated differently, cell 100 may not have octahedral sites 130 full filled by H and/or N. In some cases, vacancies in tetrahedral positions 120 and/or rare earth/FCC positions 110, if present, may also be identified.

Thus, using Raman spectroscopy and x-ray diffraction, the structural characteristics of rare earth-containing materials corresponding to cell 100 may be studied and identified. For example, the lattice parameter and positions of the atoms R, H, and D (e.g., Lu, H, and N) for $RH_xD_y$ (e.g., $LuH_xN_y$), where x and y are in the ranges described herein, may be determined. Slight variations in stoichiometry, for example $LuH_xN_y$ being sub-stoichiometric (including N and/or H vacancies) may be determined. Further, as discussed herein, the structural properties of $RH_xD_y$ may be compared with known and/or new rare earth-containing materials. As such, identification of materials that may be suitable for applications of rare earths may be facilitated.

The structure of a material typically influences other properties of the material. For example, electronic, magnetic, and/or mechanical properties of a material may be determined in whole or in part by its crystal structure. Thus, other properties of rare earth-containing materials generally, such as $RH_xD_y$, may be investigated using a particular material, such as $LuH_xN_y$.

Figure 3A:
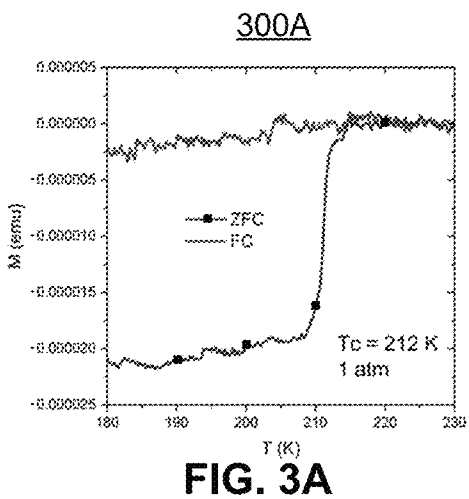
FIGS. 3A-3C depict graphs of temperature dependent DC magnetic susceptibility data corresponding to a rare earth-containing material such as nitrogen doped lutetium hydride.
Figure 3B:
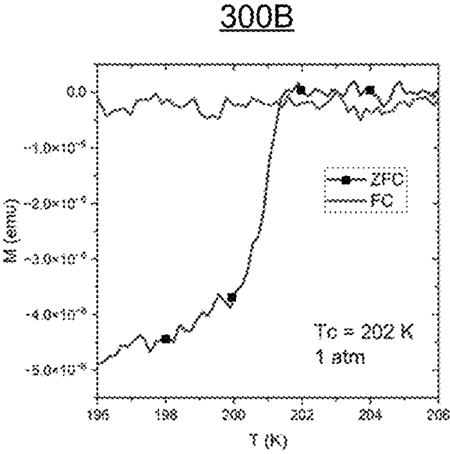
Figure 3C:
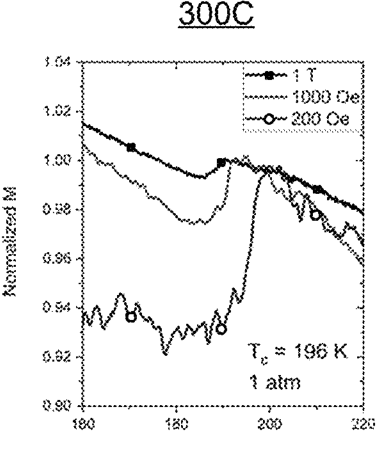
Figure 4A:
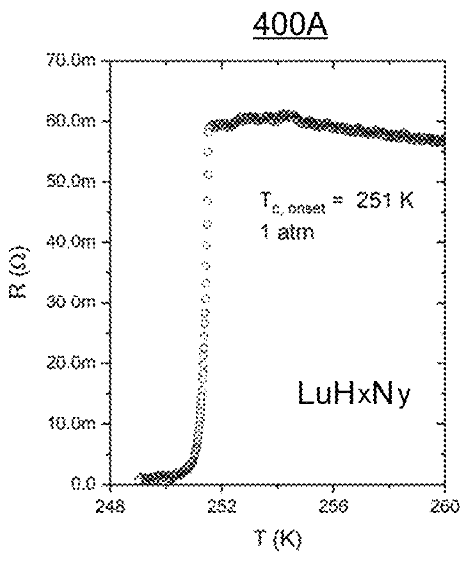
FIGS. 4A-4D are graphs indicating various electrical transport measurements corresponding to an embodiment of rare earth-containing material(s), such as nitrogen doped lutetium hydride, and the transition temperature versus varying doping levels for such rare earth-containing material(s).
Figure 4B:
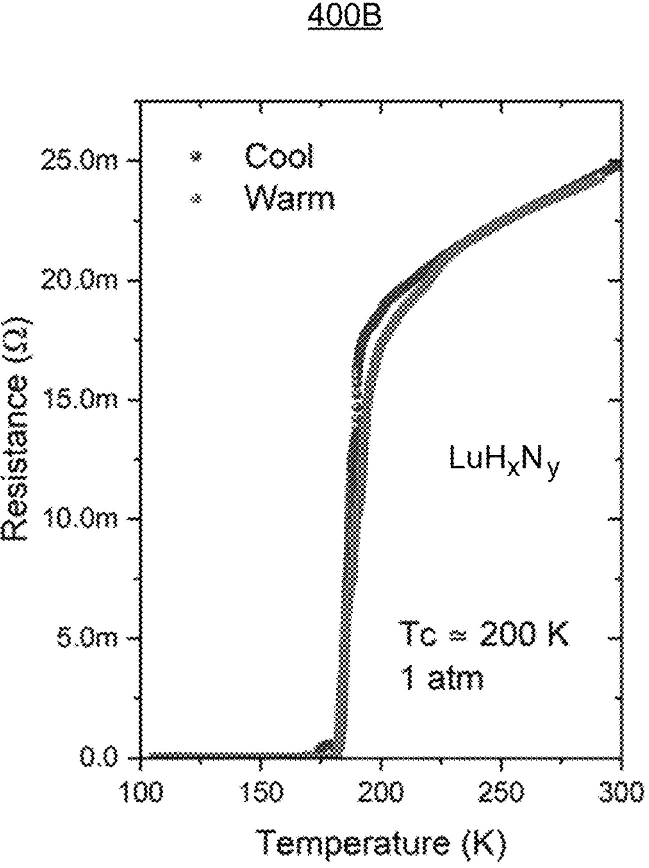
Figure 4C:
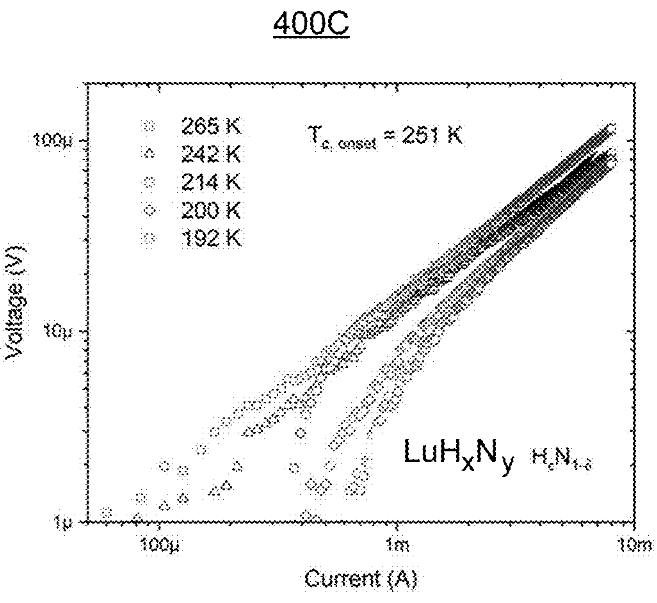
Figure 4D:
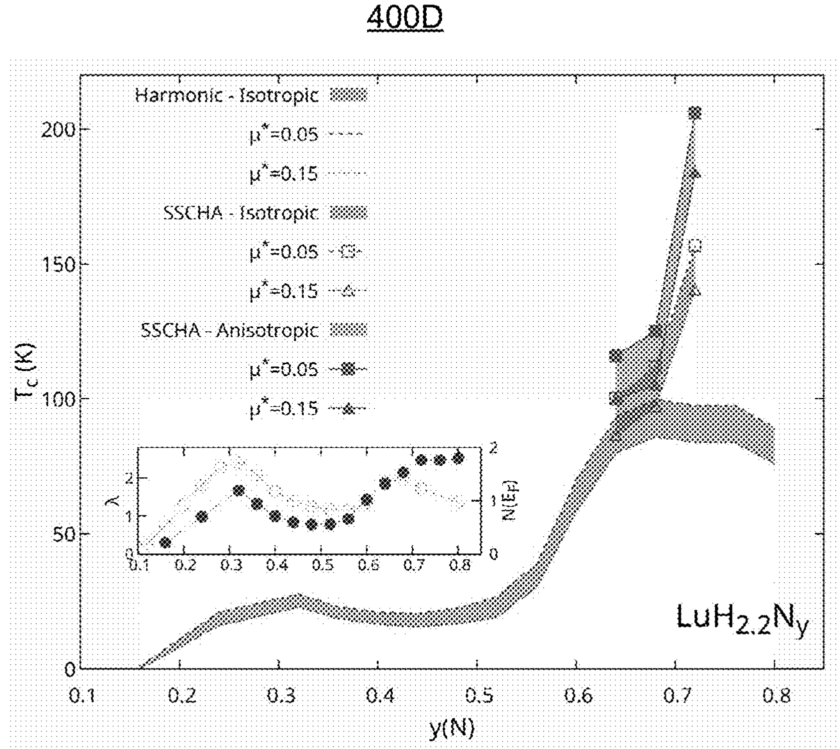

FIGS. 3A-3C depict graphs 300A, 300B, and 300C of magnetic data for $LuH_xN_y$, with x and y in the ranges described herein. Similarly, FIGS. 4A-4D depict graphs 400A, 400B, and 400C relating to electrical transport of for $LuH_xN_y$, with x and y in the ranges described herein. FIG. 4D depicts the transition temperature for embodiments of $LuH_xN_y$ having varying doping levels. Graphs 300A, 300B, and 300C depict magnetic moment versus temperature for $LuH_xN_y$ taken using a SQUID magnetometer (e.g., an MPMS SQUID magnetometer). As indicated in graphs 300A, 300B, and 300C, the rare earth-containing material $LuH_xN_y$ may have a transition, or critical, temperature ($T_c$) for a transition to and/or from a perfect diamagnet (Meissner effect) for temperatures at, near, or above 200 Kelvin at ambient pressure (e.g., approximately 1 atmosphere). In some embodiments, the critical temperature may be at or above 273 Kelvin at ambient pressure. In some embodiments, the critical temperature may be at or above 100 Kelvin at ambient pressure. FIGS. 4A-4C depict the temperature dependent DC electrical resistance data (graph 400A of FIG. 4A) and AC electrical resistance data (graph 400B in FIG. 4B) and the current-voltage (I-V) curves (graph 400C in FIG. 4C) at different temperatures corresponding to a rare earth-containing material such as nitrogen doped lutetium hydride. FIG. 4D depicts graph 400D of superconducting critical temperature ($T_c$) as a function of nitrogen doping contend (y(N)) for $LuH_{2.2}N_y$. Graph 400D depicts $T_c$ from the isotropic (dashed lines) and anisotropic (solid lines). The inset shows with filled circles the electron-phonon parameter (λ) and the density of states at EF (N (EF)) with open circles within the harmonic approximation as a function of y(N). Thus, $LuH_xN_y$ may have a critical temperature for superconductivity at, near, or above 200 Kelvin at ambient pressure. The superconducting critical temperature may be at or above 273 Kelvin at ambient pressure for $LuH_xN_y$ in some embodiments. The superconducting critical temperature may be at or above 100 Kelvin at ambient pressure for $LuH_xN_y$ in some embodiments.

Thus, a rare earth-containing materials $RH_xD_y$, such as $LuH_xN_y$, may be used not only for their intrinsic properties, but also to investigate the variation in lattice parameter, stoichiometry, positions of atoms, and other properties of rare earths. The results for $LuH_xN_y$ may be used to predict the properties of other rare earth containing materials. As part of this process, $RH_xD_y$ is desired to be fabricated and compared to known materials.

Figure 5:
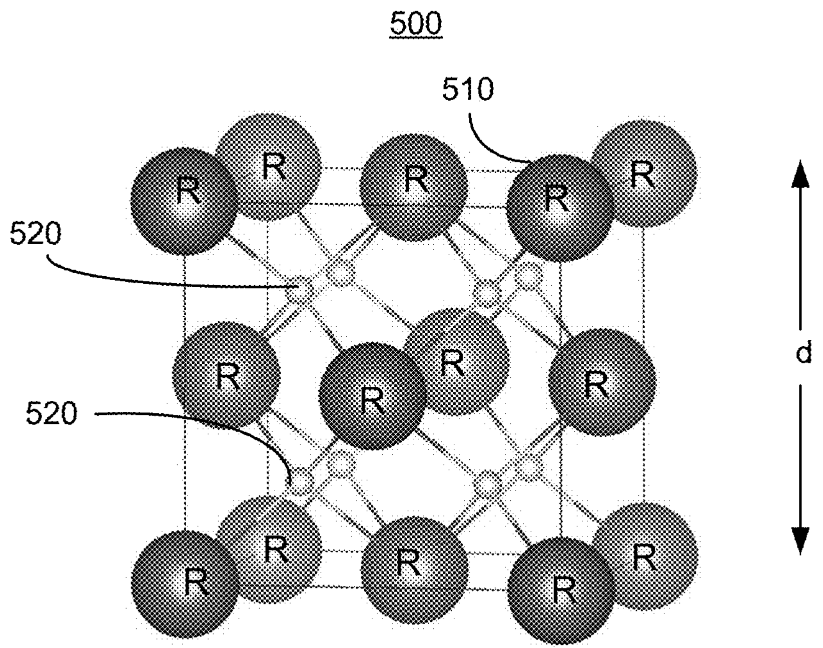
FIG. 5 depicts an embodiment of a cell of a form of a rare earth hydride.
Figure 6:
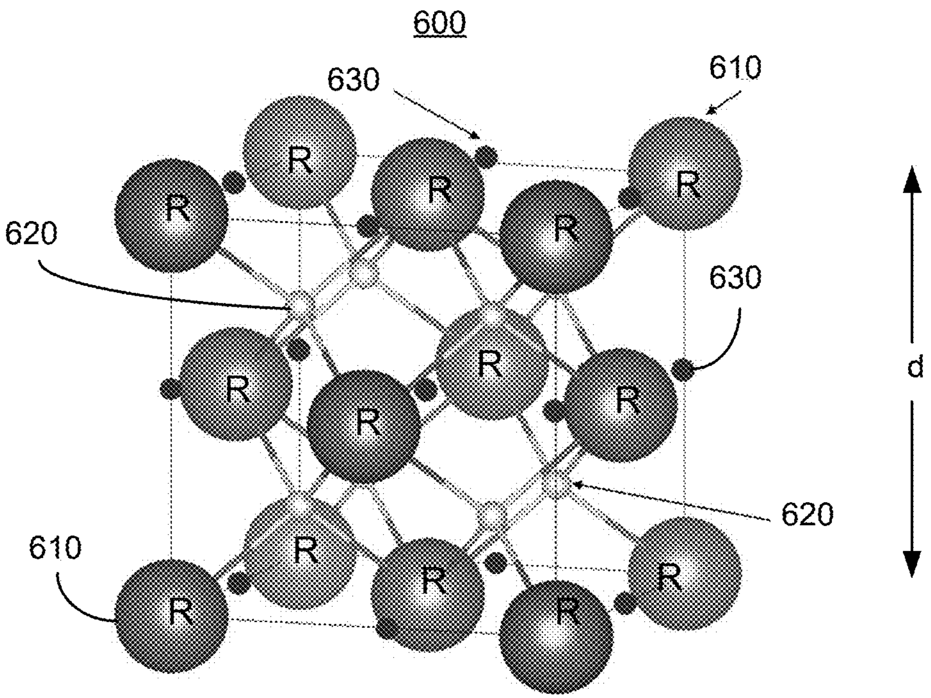
FIG. 6 depicts an embodiment of a cell of a form of a rare earth hydride.

For example, FIG. 5 and FIG. 6 depict embodiments of cells 500 and 600, respectively, of two forms of a rare earth hydride. More specifically, cells 500 and 600 correspond to lutetium hydride. Cell 500 corresponds to $LuH_2$, while cell 600 corresponds to a cubic form of $LuH_3$. Cell 500 includes R (FCC) positions 510 (large darker spheres) and tetrahedral positions 520 (small lighter spheres), of which only some are labeled. Similarly, cell 600 includes R (FCC) positions 610 (large darker spheres), tetrahedral positions 620 (small lighter spheres), and octahedral positions 630 (small darker spheres). R positions 510 and 610 correspond to R positions 110. Tetrahedral positions 520 and 620 correspond to tetrahedral positions 120. Octahedral positions 630 correspond to octahedral positions 630. Lattice parameters, d, are also shown. In general, all positions 510, 520, 610, 620, and 630 are occupied by R (Lu) atoms and H atoms. Thus, using the information described herein, such as x-ray diffraction, Raman spectroscopy, other data (e.g., electronic, magnetic, and mechanical data), the effects of dopants, such as N, may be investigated in comparison to undoped versions of the rare earth-containing material. Similarly, other arguably related materials may also be investigated.

Figure 7:
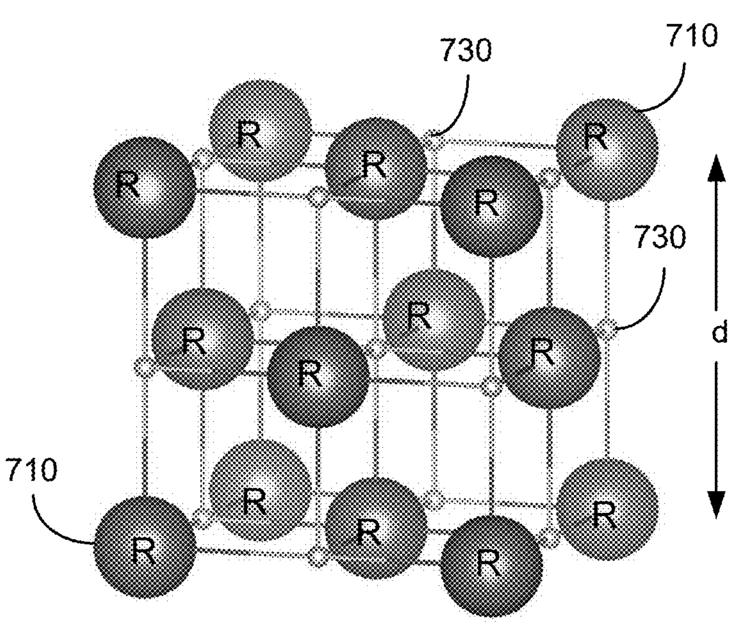
FIG. 7 is a diagram depicting an embodiment a cell indicating the crystal structure of an embodiment of a rare earth nitride.

For example, FIG. 7 is a diagram depicting an embodiment cell 700 indicating the crystal structure of an embodiment of a rare earth nitride $RD_z$, such as $LuN_z$, where $z<1$. Thus, cell 700 may be for sub-stoichiometric LuN. In some embodiments, R and D may be analogous to the materials described for $RH_xD_y$ (e.g., R may include materials such Lu, Y, Sc, Tm, and/or Y; D may include N, B, and/or O (generally in smaller amounts)). Cell 700 includes FCC R positions 710 and octahedral positions 730 that are analogous to R positions 110, 510, and 610 and octahedral positions 130 and 630. Octahedral positions 730 are locations of D (e.g., N). If all octahedral positions 730 were filled with D atoms, then the corresponding rare earth-containing material would have the form RD. However, cell 700 corresponds to a sub-stoichiometric rare earth-containing material $RD_z$, such as $LuN_z$, where $0<z<1$. Thus, cell 700 is described in the context of $LuN_z$ with $0<z<1$. For stoichiometric LuN (i.e. where z=1), octahedral sites 730 may be fully occupied. For $LuN_z$, there are vacancies at some octahedral positions 730. However, specific locations of the vacancies are not indicated in cell 700. In a macroscopic sample, composed of a large number of cells 700, there may be some defects. For example, there may be vacancies for which a rare earth atom is missing from particular R position(s) 710 or there are additional R atoms at particular R position(s) 710. However, such defects may not be sufficient to affect the stoichiometry and/or material properties.

In a similar manner to $RH_xD_y$, (e.g., $LuH_xN_y$) corresponding to cell 100, $LuN_z$ corresponding to cell 700 may indicate how changes in stoichiometry or other properties result in changes to crystal structure and/or characteristics of rare earth-containing materials. For example, LuN has a lattice parameter of approximately 4.75 to 4.76 Å. As discussed with respect to $LuH_xN_y$, this smaller lattice parameter may be due to the properties of nitrogen and/or the nitrogen interaction with Lu. Although x-ray diffraction may be capable of determining some aspects of the structure of cell 700 (e.g., lattice parameter d), other aspects may not be distinguishable using x-ray diffraction. For example, the locations and/or presence of vacancies for octahedral locations 730 may not be indicated in x-ray diffraction. Thus, $LuN_z$ may be studied in a similar manner to $RH_xD_y$, (e.g., $LuH_xN_y$).

Figure 8A:
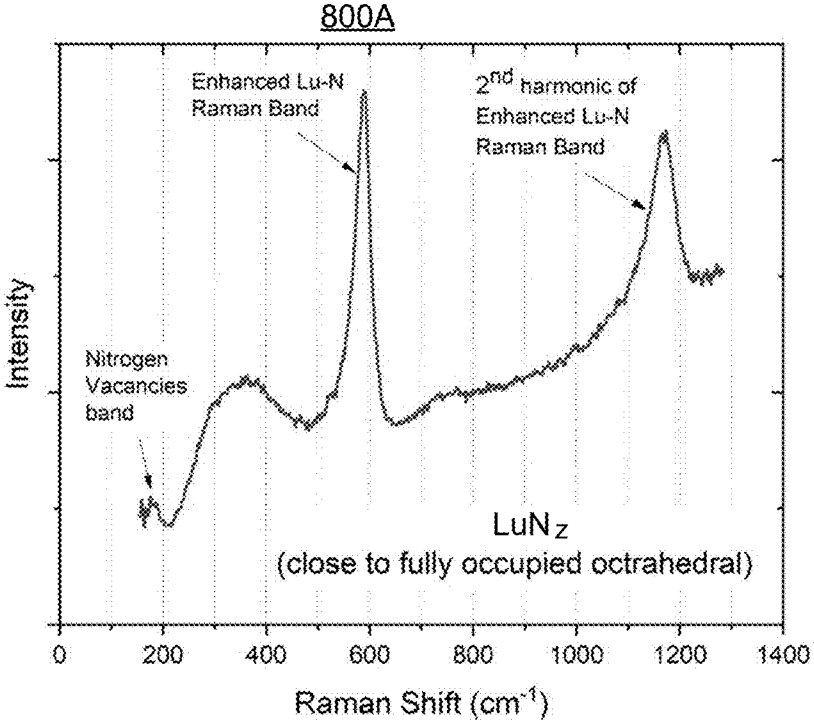

For example, FIGS. 8A-8C depicts graphs 800A, 800B, and 800C including Raman spectra for sub-stoichiometric LuN (LuNz, where z<1). As can be seen in graphs 800A and 800B, peaks indicating the Lu-N Raman band and the second harmonic of the LuN Raman band are indicated. In addition, as can be seen in graphs 800A, 800B, and 800C a nitrogen vacancy band is also indicated near 200 $cm^{-1}$ for sub-stoichiometric $LuN_z$ but not for stoichiometric LuN. The Raman spectra in graphs 800A, 800B, and 800C may also be applied in understanding the properties of $LuH_xN_y$. A comparison of graphs 800A, 800B, and 800C with graph 200D indicates that $LuH_xN_y$ and $LuN_z$, have peaks indicating octahedral vacancies near 200 $cm^{-1}$. Thus, that that that $y<1$ and $z<1$ for $LuH_xN_y$ and for $LuN_z$ may be indicated and understood by the Raman spectra. Thus, materials such as $RH_xD_y$ (e.g., $LuH_xN_y$) and/or $RD_z$ (e.g., $LuN_z$) may be used to investigate the effects of stoichiometry changes on particular rare earth-containing materials and/or to predict or understand characterization of other materials.

FIGS. 9A-9C depict graphs 900A, 900B, and 900C of magnetic data corresponding to a sub-stoichiometric rare earth-containing material, such as $LuN_z$. Graphs 900A, 900B, and 900C depict magnetic moment versus temperature for $LuN_z$ taken using a SQUID magnetometer (e.g., an MPMS SQUID magnetometer). As indicated in graphs 900A, 900B, and 900C, the rare earth-containing material $LuN_z$ may have a transition, or critical, temperature ($T_c$) for a transition to and/or from a perfect diamagnet (Meissner effect) for temperatures near 38 Kelvin at ambient pressure (e.g., approximately 1 atmosphere). Thus, $LuN_z$ may have a critical temperature for superconductivity near 38 Kelvin at ambient pressure. In such a case, the increase in the critical temperature between $LuN_z$ and $LuH_xN_y$ may be viewed as the introduction of H facilitating phonons in the rare earth-containing material, which is associated with higher critical temperatures for superconductivity.

Thus, rare earth-containing material $RD_z$, such as $LuN_z$, may be used to investigate the variation in lattice parameter, stoichiometry, positions of atoms, and properties of rare earths. The results for $LuN_z$ may be used to predict the properties of other rare earth containing materials. As part of this process, $RD_z$ is desired to be fabricated and compared to known materials.

Figures 10, 11:
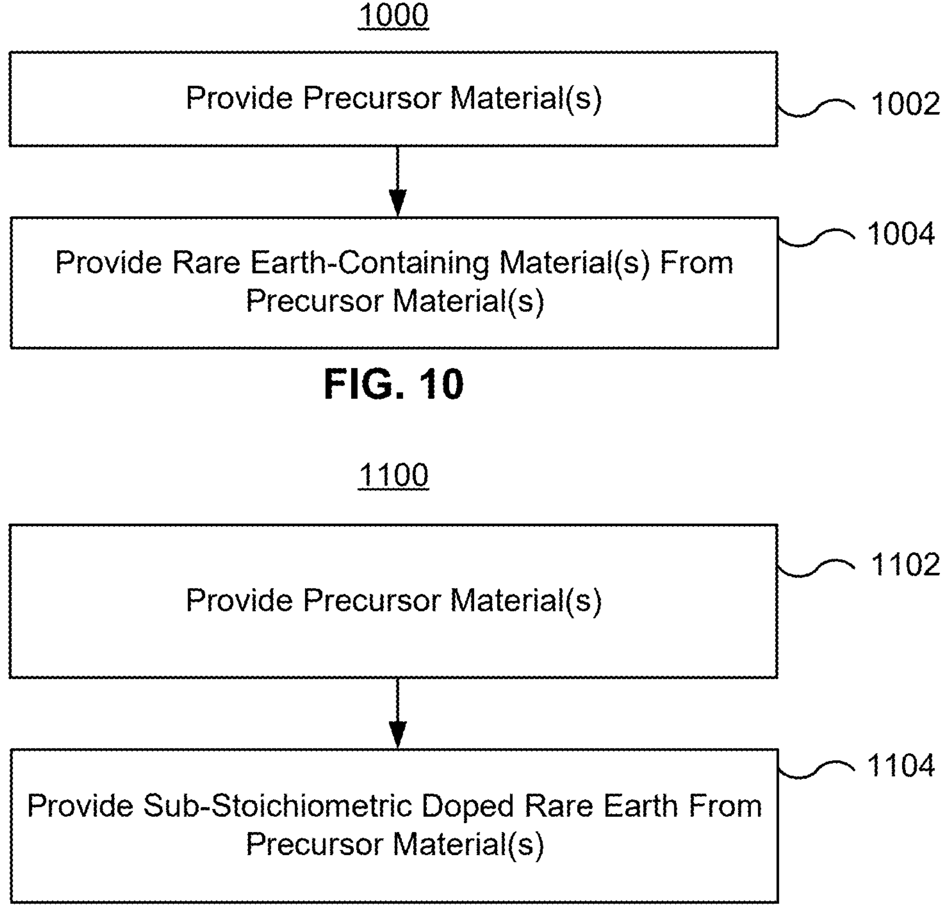
FIG. 10 is a flow chart depicting an embodiment of a method for fabricating rare earth-containing material(s).
FIG. 11 is a flow chart depicting an embodiment of a method for fabricating rare earth-containing material.

FIG. 10 is a flow chart depicting an embodiment of process 1000 for fabricating a rare earth-containing material such as $RH_xD_y$ (e.g., $LuH_xN_y$) and/or $RD_z$ (e.g., $LuN_z$). Although processes of method 1000 may be shown in a particular order, another order (e.g., in parallel) may be used. Further, steps of method 1000 may include substeps.

Precursor material(s) used in fabricating the rare earth-containing material(s) are provided, at 1002. In some embodiments, 1002 may include simply obtaining pre-made precursor material(s). In some embodiments, precursor material(s) for the rare earth-containing material(s) are synthesized. For example, $LuH_2$ (cubic) and $LuH_3$ (hexagonal) are stable at ambient. At 1002, it may be desirable to form $LuH_2$ and/or $LuH_3$.

In some embodiments, synthesis at 1002 may occur in a furnace having a particular configuration and/or limitations. The furnace might be desired to be capable of monitoring and controlling the elements within the system and the environment to which the elements are exposed. For example, a furnace having a quartz chamber may be desired to reduce the interaction of the chamber with the material(s) used. Other chambers having other material(s) which may not outgas or otherwise affect preparation of the precursor material(s) and/or rare earth-containing material(s) may be used. The furnace may be desired to have temperature monitoring and control (e.g., the rate for heating and/or cooling as well as the desired range of temperatures). The chamber may also be configured to withstand the desired pressures. For example the chamber may be used with both greater than atmospheric pressure and less than atmospheric pressure (e.g., vacuum) of the desired ranges. Further, the ability to characterize the material(s) produced while still in the furnace (e.g., in situ) may be desired. Additional processing of the precursor material(s) may also be performed at 1002. For example, ball milling (to form a finer powder) and/or other processes that may make the precursor material(s) more homogeneous and/or improve yield for the rare earth-containing material(s) may be desired.

Using the precursor material(s), material(s) including at least one rare earth are provided, at 1004. In some embodiments the material includes the rare earth(s), hydrogen (H), and/or dopant(s) (D) (e.g., $LuH_xN_y$). In some embodiments, 1004 includes providing the material that includes the rare earth(s) and the dopant(s) (e.g., $LuN_z$). In some embodiments, 1004 may be performed in the same furnace as 1002 (assuming the precursor material(s) are synthesized). In some embodiments, 1004 may be performed using other equipment. For example, 1004 may be performed using a thin film deposition system (e.g., chemical vapor deposition (CVD), sputtering, atomic layer deposition (ALD), and/or molecular beam epitaxy (MBE).

For example, 1002 may include purchasing or otherwise obtaining already available Lu, $LuH_2$, $LuH_3$, or stoichiometric LuN. In another example, $LuH_2$ and/or $LuH_3$ may be synthesized from Lu. In some embodiments, formation of $LuH_3$ at 1002, this may occur using the formula:

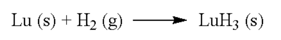

In such embodiments, pure Lu may be placed in a high-pressure reactor. Hydrogen gas ($H_2$) may be provided at greater than 500 psi and temperatures in the range of 250° C. through 350° C. (e.g., nominally 300° C.) to convert the Lu to hcp-$LuH_3$. In some embodiments, pure hydrogen gas and oxygen scavengers may be employed to reduce or prevent oxidation. In some embodiments, the above reaction may be used to synthesize $LuH_3$ in a tube furnace using excess $H_2$ and temperatures below 250° C. (and above, e.g., 100° C.). Other techniques may be used to form $LuH_3$.

In some cases, formation (or purchase) of $LuH_3$ may be followed by the reaction:

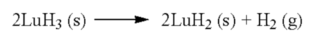

The reaction may be performed above the decomposition temperature of $LuH_3$ (approximately 300° C.) and below the disassociation temperature of $LuH_2$ (approximately 720° C.) at ambient pressure. For example, $LuH_3$ may be placed in a vacuum or inert atmosphere. This may reduce or prevent oxidation. $LuH_3$ may be held in a temperature range of 350° C. through 650° C., during which hydrogen is emitted by the solid. The emitted hydrogen gas is also evacuated to prevent recombination to $LuH_3$. Thus, $LuH_2$ may be formed via $LuH_3$.

Similarly, the following reaction might be used:

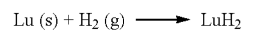

To do so, Lu may be placed in hydrogen gas at particular pressure(s) and the temperature elevated. The temperature used to transform Lu to $LuH_2$ may depend upon the pressure and vice versa. For example, a pressure of greater than 250 mbar and a temperature greater than 560° C. and not more than 600° C. (or not more than the disassociation temperature of $LuH_2$) may be used to convert Lu to $LuH_2$. In some embodiments, additional hydrogen gas is reintroduced to adjust the stoichiometry of the $LuH_2$ produced. Thus, the $LuH_2$ may be stoichiometric, sub-stoichiometric ($LuH_{2-\beta}$) or super-stoichiometric ($LuH_{2+\alpha}$). For example, Lu may be placed in a vessel (e.g., a quartz furnace) with hydrogen gas. The temperature may be elevated and the pressure monitored. A significant drop in pressure indicates that hydrogen gas has been taken up by the Lu. The temperature may remain elevated and hydrogen gas reintroduced. As more hydrogen gas is taken, the pressure drops. Once temperature and pressure remain constant, the reaction that converts Lu to $LuH_2$ is completed. Thus, (sub-stoichiometric, stoichiometric, or super-stoichiometric) $LuH_2$ may be formed directly from Lu.

Thus, at 1002, $LuH_2$ (from Lu) may be synthesized as precursor material(s) with or without using $LuH_3$ as an intermediary. In some cases, the precursor material(s) might be sub-stoichiometric (e.g., due to additional vacancies) or super-stoichiometric (e.g., due to additional atoms). Using the precursor material(s), the desired rare earth-containing material(s) may be formed, at 1004. For example, $LuH_xN_y$ or $LuN_z$ may be formed from $LuH_2$ and/or $LuH_3$.

Using method 1000 the desired rare earth-containing material(s) may be fabricated. In some embodiments, method 1000 results in the desired rare earth-containing material(s) along with other materials. For example, some amount of the precursor material may remain. For smaller pieces of the precursor material (e.g., a powder as opposed to bulk pieces or a ball milled fine powder as opposed to a powder), a larger fraction may be converted to the desired rare earth-containing material (e.g., sub-stoichiometric lutetium nitride or nitrogen doped lutetium hydride). In some embodiments, the majority of the precursor material is converted to the desired rare earth-containing material. Stated differently, the rare earth-containing material may be the majority phase. In some embodiments, the rare earth-containing material might be in isolation (e.g., for a thin film). All or substantially all of the material formed is the desired rare earth-containing material. Consequently, the rare earth-containing material(s) may be used as described herein (e.g., for investigating the structure, stoichiometry, and characteristics of the material) and/or in technological applications.

FIG. 11 is a flow chart depicting an embodiment of method 1100 for fabricating rare earth-containing material. In particular, method 1100 may be used in providing $RD_z$ (e.g., $LuN_z$). Although processes of method 1100 may be shown in a particular order, another order (e.g., in parallel) may be used. Further, steps of method 1100 may include substeps. Method 1100 is described in the context of $LuN_z$. Moreover, method 1100 may be viewed as a particular implementation of method 1000.

At 1102, the precursor material(s) are provided. In some embodiments, this includes formation or obtaining $LuH_2$, Lu, or $LuH_3$. $LuH_2$ and/or $LuH_3$ may be formed as described with respect to 1002.

At 1104, the precursor material(s) are converted to $LuN_z$. In some embodiments, 1104 may be analogous to 1004. The particular process(es) used for 1104 depend upon the precursor material(s). For example, if the precursor material used in Lu, then $LuN_z$ may be formed at 1104 by exposing Lu to nitrogen gas at very high temperatures (e.g., greater than 1650° C. If the precursor material is $LuH_2$, then the following reactions may be used:

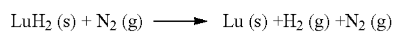

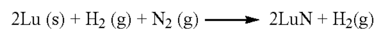

Thus, a two-step process may be used for 1104. In such an embodiment, $LuH_2$ is decomposed to Lu (e.g., at temperatures above the decomposition temperature of $LuH_2$, for example at temperatures above 720° C., at or above 900° C., or at or above 1100° C.). The Lu may then be converted to $LuN_z$.

If $LuH_3$ is the precursor material, then the following reactions may be used at 1104.

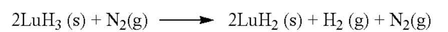

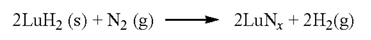

In the first reaction, $LuH_3$ and nitrogen are exposed to temperature(s) above the disassociation temperature of $LuH_3$ (e.g., above 300° C.) to form the intermediary $LuH_2$. In the second reaction, the hydride $LuH_2$ is converted to $LuN_z$. The second reaction may be considered analogous to the two-step conversion described for the precursor material $LuH_2$.

Thus, using method 1100 the desired rare earth-containing material(s), $RN_z$, may be fabricated. In some embodiments, method 1000 results in the desired rare earth-containing material(s) along with other materials. For example, some amount of the precursor material may remain, as discussed for method 1000.

Figure 12A:
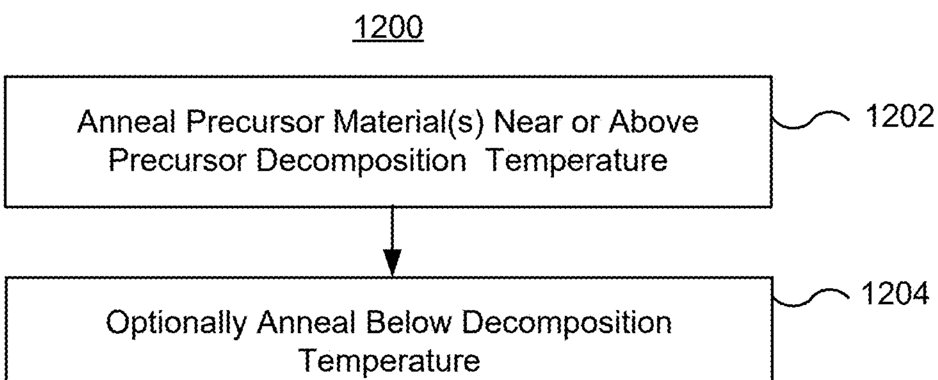
FIGS. 12A-12D depict embodiments of method for fabricating rare earth-containing material(s).
Figure 12B:
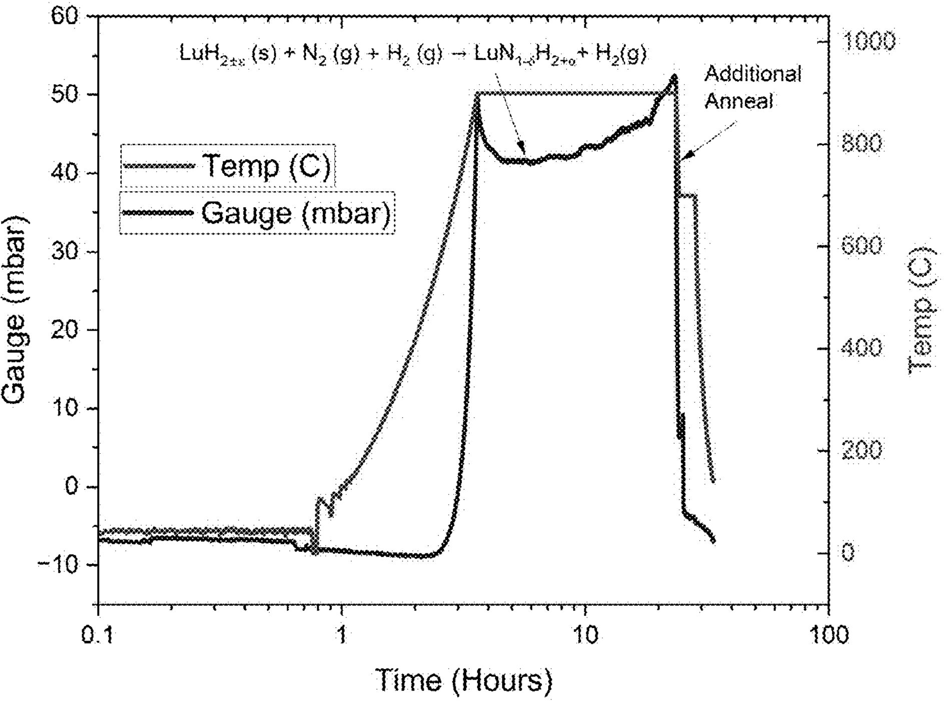
Figure 12C:
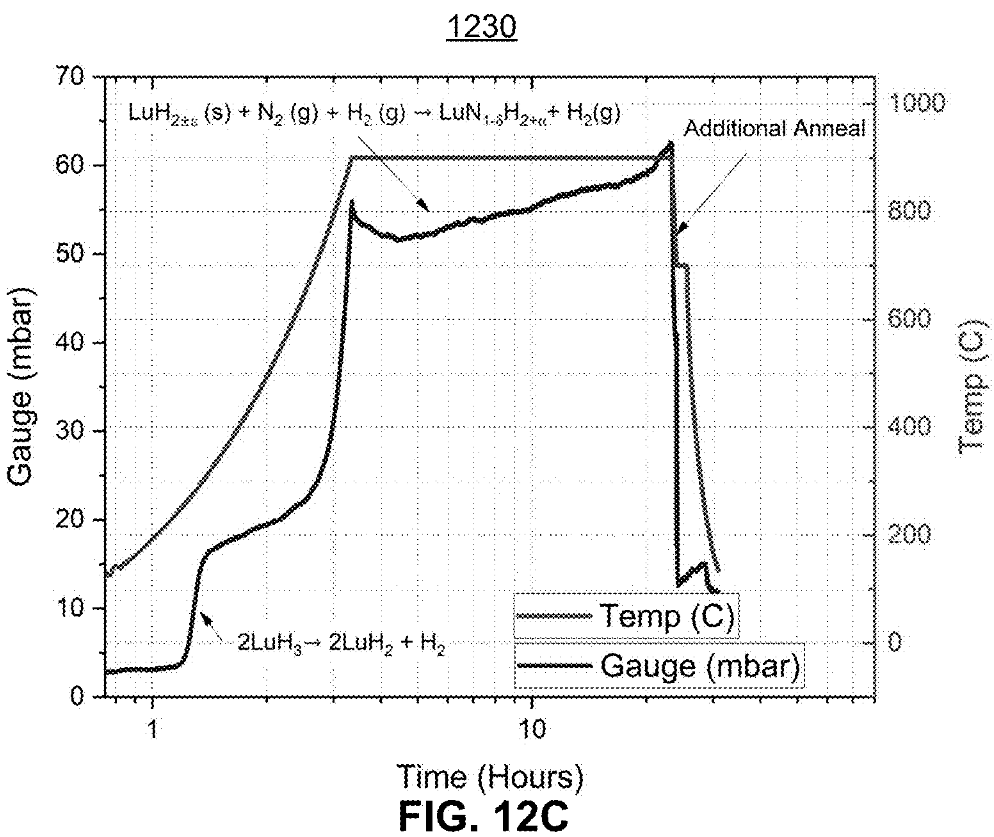
Figure 12D:
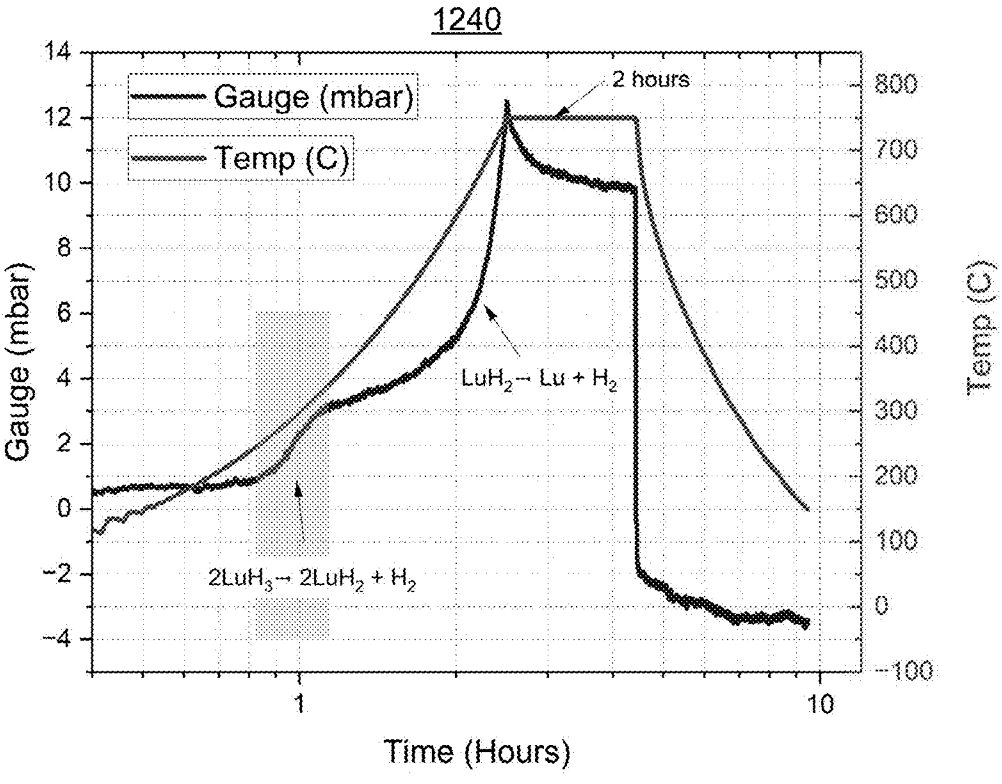

FIGS. 12A-12D depict embodiments of a method for fabricating a rare earth-containing material such as $RH_xD_y$ (e.g., $LuH_xN_y$) from precursor material(s). FIG. 12A is a flow chart depicting an embodiment of process 1200 for fabricating a rare earth-containing material such as $RH_xD_y$ (e.g., $LuH_xN_y$) from precursor material(s). Method 1200 may be considered analogous to step 1004 of method 1000. FIGS. 12B, 12C, and 12D are graphs depicting pressure and temperature in embodiments of method 1200. Although processes of method 1200 may be shown in a particular order, another order (e.g., in parallel) may be used. Further, steps of method 1200 may include substeps.

At 1202, the precursor material(s) are annealed near or above the decomposition temperature of the precursor material(s). For example, $LuH_2$ may be annealed in nitrogen gas at 900 C (e.g., above the decomposition temperature) or near 750 C (e.g., near/above the decomposition temperature of $LuH_2$). Similarly, $LuH_3$ may be annealed in nitrogen gas at similar temperatures. The pressure and temperature of the system may be monitored. Drops in the pressure (or a reduction in the rate of increase of temperature) indicate a change in stoichiometry. For example, the decrease in pressure may mean that nitrogen is taken up by the solid or a change in the solid from $LuH_3$ to $LuH_2$. Thus, at 1202, the following reaction may be considered to take place:

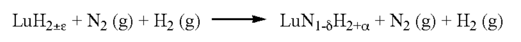

In the above reaction, α, δ, and ε indicate that the materials used and/or formed may be sub-stoichiometric and/or super-stoichiometric.

In some embodiments, an additional anneal at or near the decomposition temperature of a precursor material (e.g., $LuH_2$) may be performed, at 1204. In this context, a precursor material may include an intermediate (e.g., where precursor material $LuH_3$ is converted to $LuH_2$ as part of the process).

For example, FIG. 12B includes graph 1220 indicating one embodiment of method 1200 in which $LuH_2$ (e.g., $LuH_{2\pm\varepsilon}$) is the precursor material. At 1202, the precursor material is heated above the decomposition temperature (e.g., approximately 900° C. in this embodiment). A drop in pressure indicates the formation of a nitrogen doped lutetium hydride. Also indicated in graph 1220 is an additional anneal at or near 700° C.-750° C., at 1204. In such an embodiment 1204 may be used to adjust the stoichiometry of the final rare earth-containing material.

In another example, FIG. 12C includes graph 1230 indicating one embodiment of method 1200 in which $LuH_3$ (e.g., $LuH_{3-\gamma}$) is the precursor material. At 1202, the precursor material is heated above the decomposition temperature (e.g., approximately 900° C. in this embodiment). A drop in rate of increase of pressure indicates the formation of $LuH_2$ from $LuH_3$ (e.g., $LuH_{2\pm\varepsilon}$ from $LuH_{3\pm\gamma}$). The drop in pressure indicates the formation of a nitrogen doped lutetium hydride. Also indicated in graph 1230 is an additional anneal at or near 720° C.-750° C., at 1204. In such an embodiment 1204 may be used to adjust the stoichiometry of the final rare earth-containing material.

In another example, FIG. 12D includes graph 1240 indicating one embodiment of method 1200 in which $LuH_3$ (e.g., $LuH_{3-\gamma}$) is the precursor material. At 1202, the precursor material is heated above the decomposition temperature (e.g., approximately 750° C. in this embodiment). A drop in rate of increase of pressure indicates the formation of $LuH_2$ from $LuH_3$ (e.g., $LuH_{2\pm\varepsilon}$ from $LuH_{3-\gamma}$). The drop in pressure indicates the formation of a nitrogen doped lutetium hydride. In this embodiments, 1204 may be omitted.

Thus, using method 1200 the desired rare earth-containing material(s), $RH_xN_y$, may be fabricated. In some embodiments, method 1200 results in the desired rare earth-containing material(s) along with other materials. For example, some amount of the precursor material may remain, as discussed for method 1000.

Figures 13, 14:
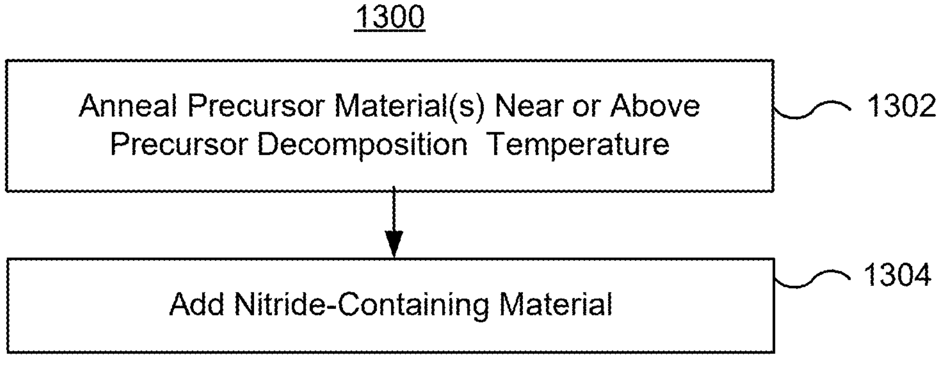
FIG. 13 is a flow chart depicting an embodiment of a method for fabricating precursor material(s) rare earth-containing material.
FIG. 14 is a flow chart depicting an embodiment of a method for fabricating precursor material(s) rare earth-containing material.

FIG. 13 is a flow chart depicting an embodiment of process 1300 for fabricating a rare earth-containing material such as $RH_xD_y$ (e.g., $LuH_xN_y$) and/or $RD_z$ (e.g., $LuN_z$) from precursor material(s). Although processes of method 1300 may be shown in a particular order, another order (e.g., in parallel) may be used. Further, steps of method 1300 may include substeps.

At 1302, the precursor material(s) are annealed near or above the decomposition temperature of the precursor material(s). For example, $LuH_2$ may be annealed in nitrogen gas at 900 C (e.g., above the decomposition temperature) or near 750 C (e.g., near/above the decomposition temperature of $LuH_2$). Alternatively, $LuH_3$ may be annealed in nitrogen gas at similar temperatures. This heating may be considered to remove hydrogen from the precursor material(s).

At 1304, a nitrogen-containing material may be added. For example, potassium nitride or sodium nitride may be added. Heat treating the substances allows the nitrogen to be from the nitride-containing material to be added to the heat-treated precursor material(s). In another, analogous embodiment, the precursor material(s) may include LuN, which is heat treated at 1302. Hydrogen or a hydrogen-containing material may be added at 1304 to allow hydrogen into the heat-treated precursor material(s).

Thus, using method 1300 the desired rare earth-containing material(s), $RH_xN_y$, may be fabricated. In some embodiments, method 1300 results in the desired rare earth-containing material(s) along with other materials. For example, some amount of the precursor material may remain, as discussed for method 1000.

FIG. 14 is a flow chart depicting an embodiment of method 1400 for fabricating precursor material(s) rare earth-containing material, such as $RH_xD_y$ (e.g., $LuH_xN_y$) and/or $RD_z$(e.g., $LuN_z$) from precursor material(s). Although processes of method 1400 may be shown in a particular order, another order (e.g., in parallel) may be used. Further, steps of method 1400 may include substeps. Method 1400 may be used in providing a thin film including $RH_xD_y$ (e.g., $LuH_xN_y$) and/or $RD_z$ (e.g., $LuN_z$). Method 1400 may commence after precursor material(s) are obtained, for example at 1002. Thus, method 1400 may be considered to be one embodiment of 1004.

At 1402, constituents for the desired rare earth-containing material are deposited on a substrate in the appropriate atmosphere. In some embodiments, 1402 may include process(es) such as chemical vapor deposition (CVD), atomic layer deposition (ALD), sputtering, and/or other techniques for growing thin films. In some embodiments, a multilayer is deposited at 1402. For example, layers having different constituents may be alternately deposited. In some embodiments, materials are co-deposited at 1402.

At 1404, the material(s) may be heat treated. In some embodiments, 1404 may be interleaved with or performed in parallel with 1402. In other embodiments, 1404 may be performed after 1402. For example, 1404 may include annealing the material(s) after deposition, annealing portions of the materials (e.g., sublayers of a multilayer or a thinner portion of a layer that includes co-deposited materials), heating the substrate and/or deposition system before, during or after deposition, and/or other techniques.

Using method 1400 the desired rare earth-containing material(s), $RH_xN_y$ (e.g., $LuH_xN_y$) and/or $RD_z$ (e.g., $LuN_z$) might be fabricated. In some embodiments, method 1400 results in the desired rare earth-containing material(s) in isolation (e.g., the majority or only phase) on the substrate. Thus, using method(s) 1000, 1100, 1200, 1300, and/or 1400, the material(s) having the desired composition may be fabricated for uses such as investigating the properties of rare earth-containing materials and/or technological applications.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

a material including at least one rare earth (R);

hydrogen (H); and at least one dopant (D), the material including R, H, and D in a ratio of 1:x:y, where x is greater than 2 and less than 3, and y is at least 0.4 and less than 1; and at least one additional material, the at least one additional material including at least one of O or Si wherein R is lutetium (Lu) and D is nitrogen (N).

2. The system of claim 1, wherein the material has a crystal structure and a stoichiometry $LuH_xN_y$.

3. The system of claim 2, wherein x is at least 2.1 and not more than 2.3 and y is at least 0.7 and not more than 0.8.

4. The system of claim 2, wherein the crystal structure has face-centered cubic positions, tetrahedral positions, and octahedral positions; and wherein the face-centered cubic positions include Lu atoms, the tetrahedral positions include H atoms, and the octahedral positions include both the H atoms and N atoms.

5. The system of claim 4, wherein a portion of at least one of the octahedral positions, the face-centered cubic positions, or the tetrahedral positions have at least one vacancy.

6. The system of claim 2, wherein the material has a lattice parameter depending on x and y.

7. The system of claim 1, wherein the material is present with at least one additional Lu containing material.

8. The system of claim 7, wherein the material includes at least one of a powder or a thin film residing on a substrate, the thin film having a thickness of at least ten nanometers and not more than three micrometers.

9. The system of claim 1, wherein the material and the at least one additional material are present in at least one of a powder or a thin film, the at least one additional material being present in the at least one of the powder or the thin film such that the at least one of the powder or the thin film has an additional ratio of Lu:H:N:D2, where D2 indicates the at least one of oxygen or silicon is 1:x:y:z, where x is zero or greater than 2 and less than 3, y is at least 0.4 and less than 1, and z is greater than 0 and less than 0.3.

10. The system of claim 1, wherein the material includes the at least one additional material such that the material has a Lu:H:N:D2 ratio, where D2 indicates the at least one of oxygen or silicon' is 1:x:y:z, where x is zero or greater than 2 and less than 3, y is at least 0.4 and less than 1, and z is greater than 0 and less than 0.3.

* * * * *